Inventor: Jean Cadiou
By: Wenderoth, Lind and Ponack

Inventor: Jean Cadiou
By Wenderoth, Lind and Ponack 3,213,618
METHOD OF REGULATING THE INPUT TORQUE OF A ROTATING BARREL AND PLUNGERS TYPE HYDRAULIC TRANSMISSION
Jean Cadiou, Paris, France, assignor to Societe Anonyme Andre Citroen, Paris, France, a French corporation
Filed Mar. 27, 1964, Ser. No. 355,310
Claims priority, application France, Mar. 29, 1963, 929,793, Patent 1,372,444
10 Claims. (Cl. 60—53)

In numerous applications, particularly for the propulsion of motor vehicles, transmission systems of the continuously variable ratio type are constrained to operate, for a given power, with a constant input torque and a variable opposing torque.

Such regulation can be ensured by simple and reliable means in the case of a hydraulic transmission with rotating barrels and plungers.

If, assuming such a transmission system, the term "cubic capacity" be taken in the usual way to mean the volume of liquid sucked in by an element during one revolution of its barrel, and if furthermore, $C_1$, $V_1$, $N_1$ be taken to designate the generator torque, cubic capacity and r.p.m.,
$C_2$, $V_2$, $N_2$ the motor torque, cubic capacity and r.p.m.,
$P$ the working pressure or "high pressure," and
$r$ the demultiplication ratio, then, adopting appropriate units, the following relations are obtained:

(1) $$C_1 = \frac{PV_1}{2}$$

(2) $$C_2 = \frac{PV_2}{2}$$

(3) $$r = \frac{N_1}{N_2} = \frac{V_2}{V_1}$$

(4) $$C_2 = rC_1$$

Relations 1 and 2 show that in the form it is posed (i.e., imposed driving torque $C_1$ and given opposing torque $C_2$), the problem provides an infinity of possible solutions for $P$, $V_1$ and $V_2$, and a consequent infinity of functional modes for which the ratio $r$ defined by Relation 3 assumes a value satisfying Relation 4.

Among these various possible functional modes, two may be considered for use over complementary ranges of the overall range of possible speed ratios, as under:

(1) For large values of the demultiplication $$r = \frac{V_2}{V_1}$$

(i.e., for vehicle starting and slow running speeds thereof), the cubic capacity $V_2$ of the motor element is maintained constant at its maximum value and the variation in $r$ is obtained solely by varying $V_1$.

Relations 1 and 2 show that when this is the case the pressure $P$ is inversely proportional to the cubic capacity $V_1$ (since $C_1$ is constant) and that $C_2$ is directly proportional to $P$.

(2) When $V_1$ reaches its highest value, corresponding to the lowest demultiplication ratio $$r = \frac{V_2}{V_1}$$

feasible in the aforesaid functional mode, it is the cubic capacity $V_1$ of the generator that is maintained constant and the cubic capacity $V_2$ of the motor that is varied, thus providing for the transition to smaller demultiplication ratios corresponding to higher road speeds.

In this second functional mode, the Relations 1 and 2 show, firstly, that the constancy of $C_1$ and $V_1$ leads to the constancy of the pressure $P$ and, secondly, that $C_2$ is directly proportional to the cubic capacity $V_2$.

The control means whereby a hydraulic transmission of the rotating barrel and plungers type is enabled to function in the modes hereinbefore referred to consequently imply a method of governing the variation of the cubic capacities of the generator and the motor.

This governing method consists of varying the angle of inclination of the stationary swashplates (hereinafter referred to as "impulsors") over which ride the ends of the barrel plungers, this angle of inclination being always sufficiently small to be taken to be substantially proportional to the cubic capacity.

It is one object of this invention to provide a method of regulating the input torque of a rotating barrel and plungers type transmission system whereby the problem posed precedingly may be solved along the lines indicated hereinabove, which method is essentially characterized in that the regulating method employed involves continuously balancing, by means of a regulating distributor, two forces which are respectively proportional to the high pressure of the transmission liquid and to the reference pressure of a mass of gas of substantially constant temperature which is contained at least partly in a deformable chamber and whose volume, which is adjustable as a function of the input torque, is caused to be proportional to the cubic capacity of the generator.

It is a further object of this invention to provide apparatus for performing the method hereinbefore disclosed, comprising, on the one hand, a deformable chamber made up of two parts of which one is a cylindrical reservoir closed by a flexible diaphragm containing at least part of the reference gas and of which the other is a piston sliding with side clearance in said reservoir while impelling said diaphragm before it, and, on the other hand, a regulating distributor whose slide is associated at one end to the generator impulsor plate through a mechanical linkage which includes said deformable chamber, whereby the elastic expansion force exerted between the two portions of said chamber tends both to increase the inclination of said impulsor plate and to thrust said slide into the main casting of the regulating distributor against the countering force exerted on its other end by the high pressure in the transmission system, said slide comprising two waisted sections respectively communicating with the low pressure circuitry served by the feed pump and with the discharge tank, and an intermediate section therebetween which positions itself opposite the port leading into the conduit which feeds the actuator referred to hereinbelow.

Such apparatus acts as means for reducing the low pressure, whereby to operate at least one impulsor-plate actuator, and additionally comprises a mechanism whereby the volume occupied by the reference gas can be modified as a function of the input torque.

It is to be understood that the present invention includes in its scope all combinations and alternative embodiments of the means hereinbefore set forth and that it includes more specifically all such devices as have recourse to the two functional modes referred to precedingly, either through consecutive control of the two impulsor plates, or through exclusive control of either thereof.

The invention further includes the various possible forms of embodiment of the mechanism for regulating the volume occupied by the reference gas in terms of the power required.

The description which follows of a number of non-limitative exemplary forms of embodiment of the invention, given with reference to the accompanying drawing, will give a clear understanding of the invention and of how it can be carried into practice.

Referring to the drawing filed herewith:

Figure 4:
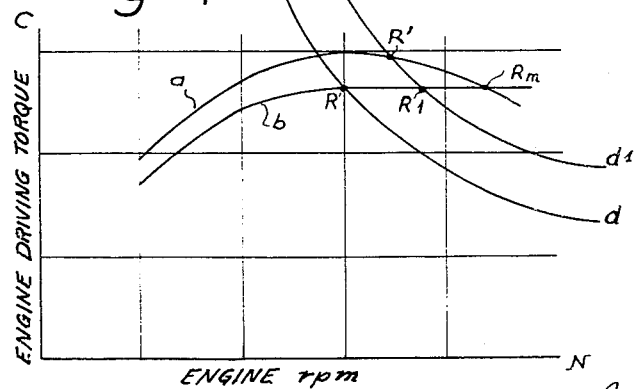

FIGURE 4 is a typical functional diagram corresponding to a transmission according to FIGURE 1, and FIGURES 5, 6 and 7 show three different functional configurations of a transmission according to the invention capable of consecutively utilizing the two functional modes referred to precedingly and wherein regulation is effected by varying the cubic capacity of the generator and then of the motor, in the sense of increasing speeds at the load absorbing end, or vice versa.

Figure 1:
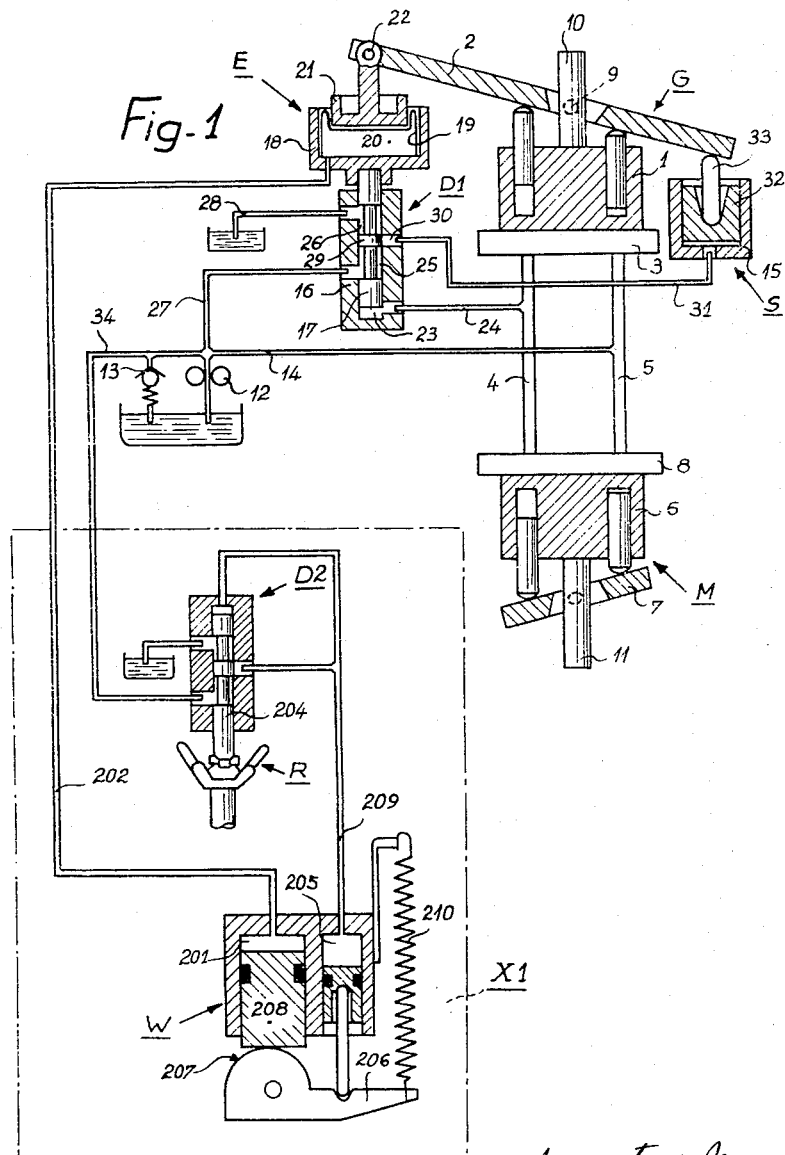
FIGURE 1 is a diagrammatic sectional illustration of an arrangement according to the invention, wherein only the generator inpulsor plate is movable and wherein the gas volume is adjusted by a volume variator controlled by a centrifugal governor.

In the form of embodiment shown in FIGURE 1, the two basic members of the transmission system are a generator G having a barrel 1 rotating between an impulsor plate 2 and a fixed faceplate 3, and a motor M having a barrel 6 rotating between an impulsor plate 7 and a fixed face plate 8.

The two faceplates are interconnected by a high pressure pipe 4 and a low pressure pipe 5. The impulsor plate 2 of G is pivotally mounted on a shaft 9. Impulsor plate 7 of M is locked at maximum inclination.

The input and output shafts of the transmission system are designated by reference numerals 10 and 11 respectively.

A low pressure pump 12 calibrated by a valve 13 provides the low pressure level for the transmission through its connection to pipe 5 via conduit 14, and additionally ensures a servo-controlled regulation.

For specific applications wherein the high or low pressures may be reversed during operation, provision must be made for an appropriate valve arrangement, in a manner well known per se, between the conduits 14 and 24.

The servo-control is obtained by a distributor-regulator D1 whose main casting 16 is stationary relative to faceplates 3 and 8 and whose cylindrical slide 17 is connected to impulsor plate 2 of G through the agency of a deformable chamber E.

The chamber E consists of a cylindrical reservoir 18 rigid with slide 17 which constitutes a slide valve and closed by a flexible diaphragm 19 bounding a capacity 20 inside which a piston 21 pivotally connected to impulsor plate 2 at 22 is slidable by displacing said diaphragm with it.

The capacity 20 varies according to the degree of penetration of piston 21 in reservoir 18 and consequently depends on the degree of inclination of impulsor plate 2, i.e., on the cubic capacity of generator G. Capacity 20 is additionally connected to a stationary but adjustable capacity 201 which will be referred to in greater detail hereinbelow.

It will be assumed that it is possible to find a position of reservoir 18 and a value of capacity 201 such that the total volume of a body of gas enclosed within capacities 20 and 201 be directly proportional to the cubic capacity of generator G.

This being so, said body of gas will tend to separate the two portions 18 and 21 of deformable chamber E and will exert on slide 17 a thrust tending to push it deeper into the casting 16 of distributor-regulator D1.

This thrust is countered by a thrust exerted in the opposite direction against the extremity of slide 17 remote from E, and which is due to the transmission high pressure continuously prevailing in a chamber 23 of casting 16, which chamber 23 has port in pipe 4 through conduit 24.

Reference to FIGURE 1 clearly shows that slide 17 embodies two waisted sections whereby there is respectively provided, in casting 16, a chamber 25 connected to the pump through conduit 27 and chamber 26 connected to the discharge means through conduit 28.

These two waisted sections of the slide are separated by a cylindrical portion 29 whose height is equal to that of a port 30 which is connected through a conduit 31 to the cylinder 15 of an actuator S whose piston 32 thrusts against impulsor plate 2 through a pushrod 33 in the direction tending to reduce the inclination of said plate.

The mechanism X1 for adjusting the volume of the reference gas comprises, in the form of embodiment described, an auxiliary distributor D2 of the same type as D1, which is supplied at low pressure through a conduit 34 and whose slide valve 204 is controlled by a centrifugal governor R.

Through a conduit 209, said auxiliary distributor D2 supplies the capacity 205 of the actuator of a volume variator W, and this actuator bears, against the countering force of a return spring 210, on a lever 206 embodying an eccentric cam 207. Cam 207 provides nonreciprocal control over the piston 208 of said volume variator whose chamber 201, as already stated, communicates with the capacity 20 of the deformable chamber E through conduit 202.

For a proper appreciation of the manner of operation of this device, the function of the regulating device X1 will be ignored for the time being, and it will be assumed that the volume 201 is such that the total volume of the reference gas is proportional, irrespective of the position of plate 2, to the dihedral angle which the plane containing said plate forms with a plane perpendicular to the rotation axis of generator G. (Strictly speaking, this would require that said total gas volume be null when this dihedral angle is equal to zero—a condition which is never obtained in practice.)

This being so, there will exist a proportional relationship between the cubic capacity $V1$ of the generator and the total volume $v$ occupied by the gas, which may be written $V1=nv$, where $n$ is a constant.

In addition, the pressure $x$ of this body of gas will produce, in deformable chamber E, an expansion force $ax$ proportional to $x$ and tending at once to lift plate 2 and to thrust slide 17 into casting 16 of D1.

Since slide 17 additionally sustains an opposing force $bP$ proportional to the transmission high pressure P prevailing in chamber 23, it is consequently acted upon by two opposing forces $ax$ and $bP$ which give rise to a resultant force $F=ax-bP$ urging piston 21 into reservoir 18.

This being so, it will first be assumed that the system is in a first steady state of operation, with the slide 17 in equilibrium for a given input torque. By reason of this equilibrium, $F=0$ and $$P=\frac{a}{b}x$$

and this latter relationship between P and $x$ holds good in all cases where slide 17 is in equilibrium.

As already indicated in the preamble to this specification, the functional mode by variation of the generator cubic capacity is such that the output torque C2 is directly proportional to P and the input torque, given by $$C1=\frac{PV1}{2}$$

constant.

Should the opposing torque C2 be reduced at any time, the liquid pressure, which is proportional thereto, drops also until a value is reached such that the force $ax$ due to the gas pressure overcomes the force $bP$ due to the liquid: the resultant F then becomes positive and slide 17 is thrust inwardly. In so doing, the slide portion 29 segregates port 30 from chamber 25 (in which the pump low pressure prevails) and causes it to communicate with draining chamber 26.

As a result, the actuator S is also caused to discharge to exhaust through its pipe 31 linking it with port 30 of D1.

Piston 32 of S therefore moves inwardly in response to the force $ax$ of chamber E, and plate 2 is tilted more acutely, thereby increasing the cubic capacity of G and augmenting the volume $v$ occupied by the gas.

But since said gas has a determinate mass and is subjected to change under conditions wherein it is at substantially constant temperature and remote from its liquefaction point, it will obey Boyle's law, which may here be written $vx=k$, where $k$ is a constant.

This being so, it will be appreciated that any increase in $v$ will cause a reduction in $x$ until the force $ax$ is equal to the countering thrust $bP$.

When the system reaches this new state, the slide will be in equilibrium once more and the impulsor plate 2 of generator G will remain stationary again.

The state of equilibrium of slide 17 again gives $$P=\frac{a}{b}x$$

But since also $V1=nv$, the input torque $$C1=\frac{PV1}{2}$$

may be written as below after substituting for P and V1 their respective values given precedingly:

$$C1=\frac{1}{2}nv\times\frac{a}{b}x=Avx$$

where A is a constant. Lastly, since the volume $v$ and the pressure $x$ of the body of gas are linked by the relation $vx=k$, as pointed out precedingly, this gives $$C1=Ak=\text{constant}$$

The second state of slide equilibrium achieved as the result of the process hereinbefore described thus infers a steady operating state of the transmission system, wherein the input torque has been restored to its initial value due to the change in the cubic capacity of the generator (i.e., in the demultiplication ratio which, in this instance, has been reduced), this change having been effected by the distributor D1.

It will be manifest that if the opposing torque C1 had increased instead of decreasing, the slide 17 would have lifted in response to a thrusting force $bP$ greater than $ax$, and that the actuator S would have been fed with the pump low pressure and would have developed a thrust which is also greater than the expansion force $ax$, so that $v$ decreases and $x$ increases, and hence also the thrust $ax$ which eventually causes slide 17 to move once more until the liquid thrust $bP$ is counterbalanced (corresponding to a smaller generator cubic capacity, i.e., to a greater demultiplication ratio).

In practice, the inclination of plate 2 is corrected very rapidly, especially for small variations in the opposing torque, so that slide 17 sustains continual oscillation of very small amplitude about its position of equilibrium, which position is reached when slide portion 29 masks port 30. The pressure delivered by D1 into conduit 31 and actuator S is then a regulated pressure, reduced to a given value, which is intermediate the pump pressure and the discharge pressure and such that equilibrium of the slide 17 is achieved at all times.

Thus, constancy of the input torque is invariably achieved in this functional mode of operation by causing the constancy of the product PV1 proportional to C1 to be dependent upon the product of the pressure $x$ times the volume $v$ of a mass of gas obeying Boyle's law.

Clearly, this correlation is possible only provided that the proportional relationships are indeed observed between P and $x$ and between $v$ and V1.

When the input torque is susceptible of variation, as in the case of a motor vehicle, it becomes mandatory to select a regulation-governing torque curve slightly below the curve obtained for maximum engine load. It will be seen that, for all practical purposes, this curve is the curve giving the most economical fuel consumption. The diagram of FIGURE 4 (in which engine driving torque C is plotted against engine r.p.m. N) represents these two curves, the curve $a$ being the maximum engine load curve and the curve $b$ the governing curve; the latter terminates in a flat section which intersects the curve $a$ at a point R$m$ corresponding to an r.p.m. figure giving maximum engine power. It should be noted that the governing curve will have to be qualified by the mechanical efficiency of the generator and its control members when calculating the permissible pressures for a given cubic capacity. On the diagram of FIGURE 4, $d$ and $d1$ are isopower curves.

*Operation, FIG. I modification*

A transmission system automatically controlled as hereinbefore described and applied to a motor vehicle would function in the following manner:

For starting, the generator is at maximum cubic capacity. A device (not shown) by-passes the flow and, during the starting phase, synchronizes the flow through the pump with that through the receiving means.

When the driver opens the throttle to obtain an engine load over and above curve $b$, then if the vehicle is at a standstill the pressure P acting on slide 17 will determine a force $bP$ greater than the force $ax$ due to the gas and cause the low pressure from group 12 to be admitted into actuator S, which in turn tilts the generator impulsor plate to obtain a smaller cubic capacity, thereby compressing the volume of gas in E until the force exerted against the extremity of slide 17 is balanced.

Under steady power conditions, i.e., with a given throttle openings, the engine will be operating at a point R of the curve $b$ and the demultiplication ratio will adjust to the road profile automatically: if the gradient increases, the opposing torque will increase and, with it, the pressure P which determines the intake into actuator S until the steady state is attained. If the gradient decreases, the opposing torque also decreases, thus causing the pressure to drop and the actuator S to exhaust correspondingly. In each case, the magnitude of the input torque and hence of the speed is restored for the specific power setting $d$, in consequence whereof the engine operating point remains at R.

If the driver accelerates and thereby determines a higher power setting $d1$, the engine loading will exceed the curve $b$ and the operating point will shift to R' on curve $a$; but since the engine torque has increased at the same time, the pressure will likewise have increased and modified the cubic capacity of the cylinders of the generator until the slide 17 as steady, which corresponds to a shift of the operating point to R1, the point of intersection of the curve $a$ and the isopower curve $d1$ corresponding to the new power setting. If this engine load corresponds to maximum throttle, then the engine r.p.m. will be given by the point $R_m$ of maximum power output whereat the two curves $a$ and $b$ intersect.

Conversely, when the driver lifts his foot off the accelerator pedal and thereby closes the throttle, the engine torque diminishes, the pressure drops, the slide 17 assumes the discharge position and the thrusting force $ax$ of the gas tilts the generator impulsor plate towards a greater cubic capacity, which may even be the maximum capacity (if the permissible torque is less than a point on the curve $b$). The vehicle will then slow down with the minimum demultiplication ratio until it comes to a standstill, in which condition the by-pass device enables the engine to idle while the vehicle is halted, by driving the generator at maximum cubic capacity.

Figure 2:
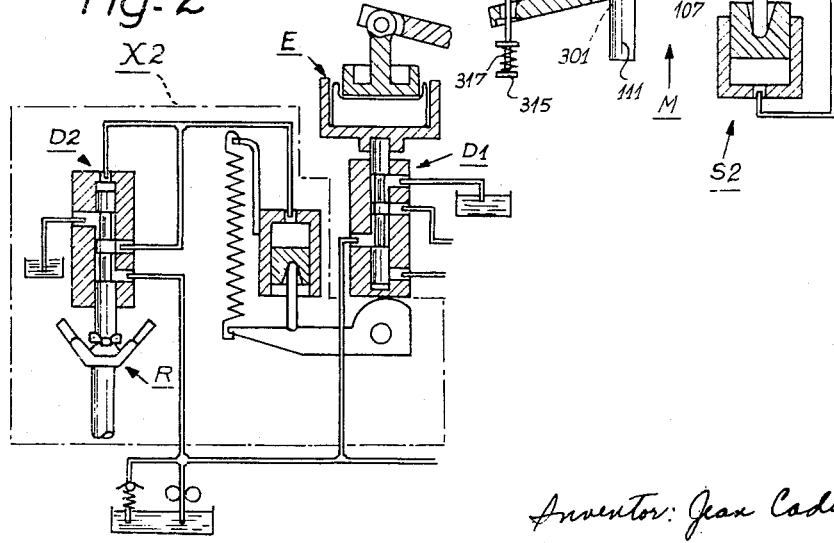
FIGURE 2 shows a first alternative form of embodiment of the volume regulating mechanism included in FIGURE 1.

The volume variator designated by X2 in FIGURE 2 is an alternative embodiment of that denoted by X1 in FIGURE 1. As FIGURE 2 clearly shows, it differs from the latter in that the cam lever operates by moving the main casting of distributor-regulator D1 through a given height, which is tantamount to correspondingly modifying, by a fixed but adjustable amount, the spacing between the reservoir and the piston of deformable chamber E.

Figure 3:
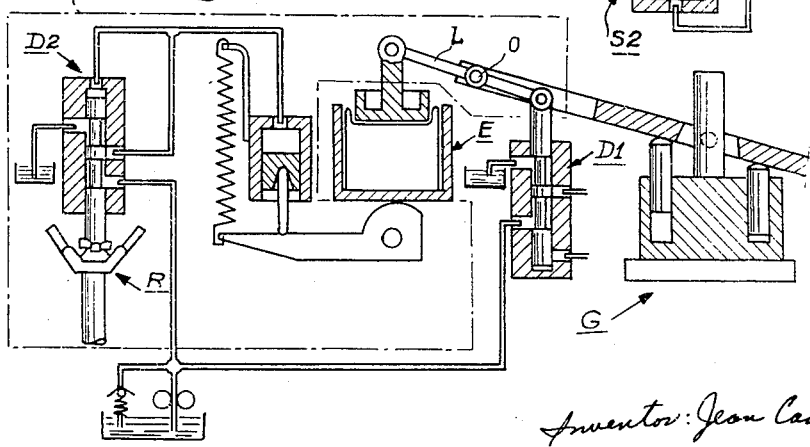
FIGURE 3 shows a second alternative embodiment thereof.

Referring next to FIGURE 3, there is shown thereon yet another alternative embodiment wherein the variator mechanism X3 is characterized in that the main casting of distributor-regulator D1 is stationary and the actuating cam operates on the bottom of the deformable chamber reservoir, the associated piston of which is pivotally connected to one end of a lever L which is fulcrumed about a shaft O rigid with the impulsor plate of G and whose other end is connected to the slide of D1.

Figure 5:
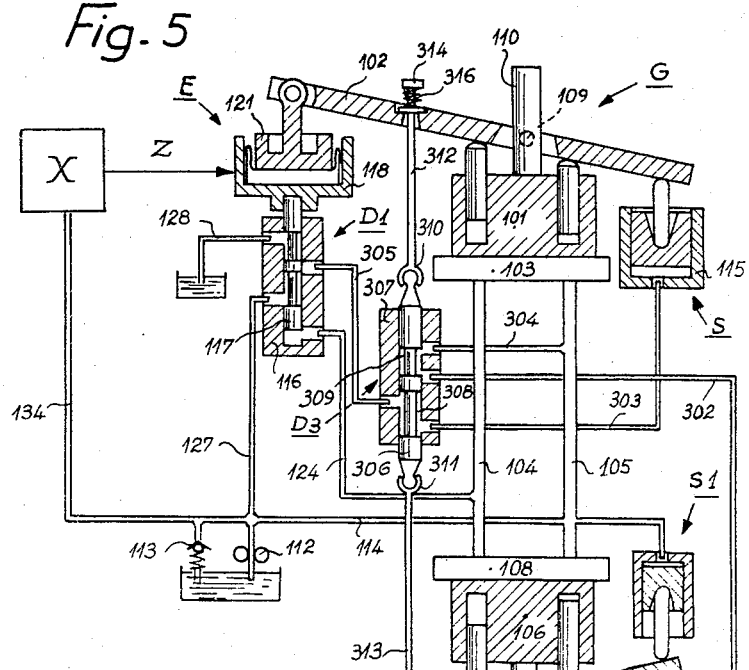

Reference is next had to FIGURE 5, which shows a form of embodiment of the invention whereby the transmission can be regulated by consecutive variations of the cubic capacities of the generator and the motor.

In order to facilitate comparison with the embodiment of FIGURE 1, like reference numerals, increased in value by 100, are used to designate like component parts, while parts specific to FIGURE 5 are designated by the number 301 onwards.

Referring now to FIGURE 5, there is shown thereon the generator G and the motor M interconnected by the high pressure and low pressure pipes 104 and 105 respectively, the distributor-regulator D1 whose slide 117 is connected to impulsor plate 102 of G through a deformable chamber E, and the actuator S for balancing the force exerted by E on plate 102.

The gas volume adjustment unit is generally designated by X and may assume either of embodiments X1, X2, X3 of FIGURES 1 through 3, the arrow Z being used to generally designate its mode of action on E.

The novel features of this specific embodiment are as follows: impulsor plate 107 of motor M is tiltable about a shaft 301 in response to a first actuator S1 which is permanently connected to the low pressure pump supply and also to a second actuator S2, of larger piston cross-section, which counters actuator S1 in the sense of increasing the motor cubic capacity and which is supplied through a pipe 302 by a distributor D3. Actuator S is also supplied by D3 through a pipe 303.

Distributor D3 is additionally connected to the low pressure pipe 105 through a pipe 304 and to the regulated pressure of distributor-regulator D1 through a pipe 305.

Slide 306 of D3 embodies two waisted sections which produce, within the bore of D3 casting 307, two chambers 308 and 309 which communicate, through suitable ports shown in the figure, with the pipes leading away from D3.

The extremities of slide 306 are connected through ball-joints 310, 311 to two rods 312, 313 which are slidable, respectively, through holes in impulsor plates 102, 107. Said rods have terminal abutments 314, 315 and are fitted with springs 316, 317 mounted intermediate the corresponding abutment and impulsor plate whereby to spring-load slide 306 when both impulsor plates 102 and 107 are at maximum inclination.

For a proper appreciation of the manner of operation of this arrangement, it will first be assumed that the transmission is in this instance ranging through the high demultiplication ratios. The slide 306 will then be in its lowermost position (as shown in FIGURE 5). As a result, actuator S2 will be continuously supplied with low pressure fluid from the pump, through pipe 302, chamber 309 and pipes 304, 105 and 114. Since actuator S2 is more powerful than opposing actuator S1, the plate 107 of motor M will be held at maximum inclination.

Furthermore, the cylinder of actuator S will be placed in communication with the regulated pressure supplied by distributor-regulator D1 through pipe 303, chamber 308 and pipe 305.

This being so, it will be manifest that this is in point of fact exactly the same as the functional mode with variable generator cubic capacity and fixed motor cubic capacity, as described precedingly with reference to the embodiment of FIGURE 1.

As already indicated, in this functional mode, there corresponds to each value of the opposing torque, for a given input torque, a determinate degree of inclination of impulsor plate 102, i.e., a determinate cubic capacity of generator G.

As the opposing torque diminishes, the inclination of plate 102 increases at the same time as the pressure P of the transmission liquid diminishes.

Figure 6:
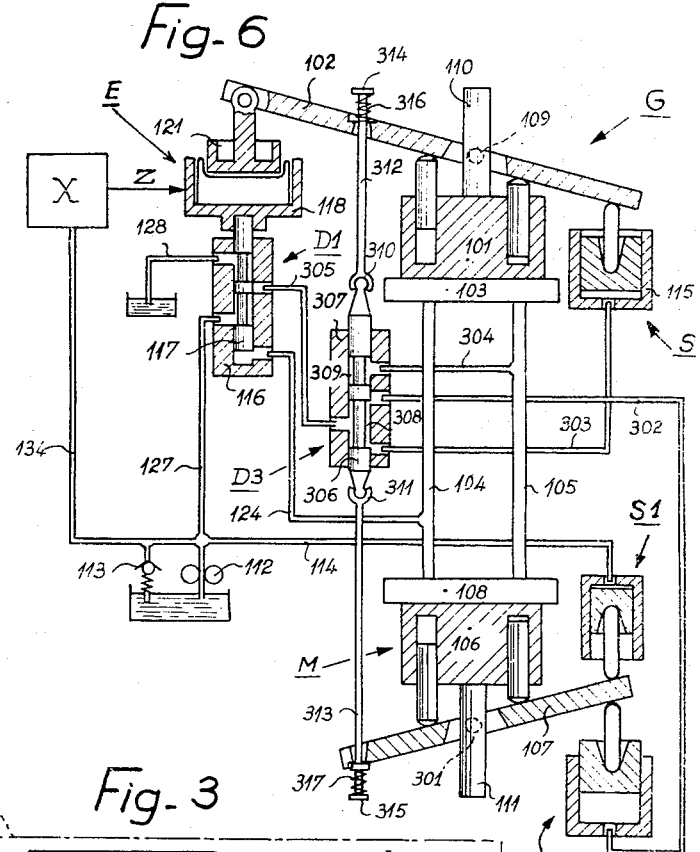

When plate 102 reaches its maximum inclination, slide 306 is pulled upwardly by rod 312 into a new position shown in FIGURE 6, wherein it is set under elastic tension by the two springs 316 and 317.

In this position of slide 306, an examination of the ports communicating with chambers 308 and 309 clearly shows (see FIGURE 6) that the actuator S is still supplied through pipe 305 at the low regulated pressure of D1, but that S2 has been cut off from the pump low pressure and now also receives the regulated low pressure of D1 through pipe 305.

If, from this position onwards, the opposing torque and the pressure P begin to increase anew, slide 117 will rise and D1 will deliver the pump low pressure which maintains S2 thrust fully home against the plate 107 of M (which will therefore not have moved) and will also supply S, which will in turn reduce the inclination of plate 102 of G, thereby causing slide 306 to descend once more and the previous functional mode to be automatically reverted to.

If, on the contrary, the opposing torque and the pressure P continue to diminish, slide 117 will move downwardly and D1 will cause both S and S2 to discharge. This will cause the piston of S to remain thrust home into its cylinder, thereby leaving plate 102 of G at maximum inclination, and the piston of S2 to recede under the pressure of the piston S1, thus reducing the inclination of impulsor plate 107 of M and raising the slide 306 of D3 to the position shown in FIGURE 7.

Figure 7:
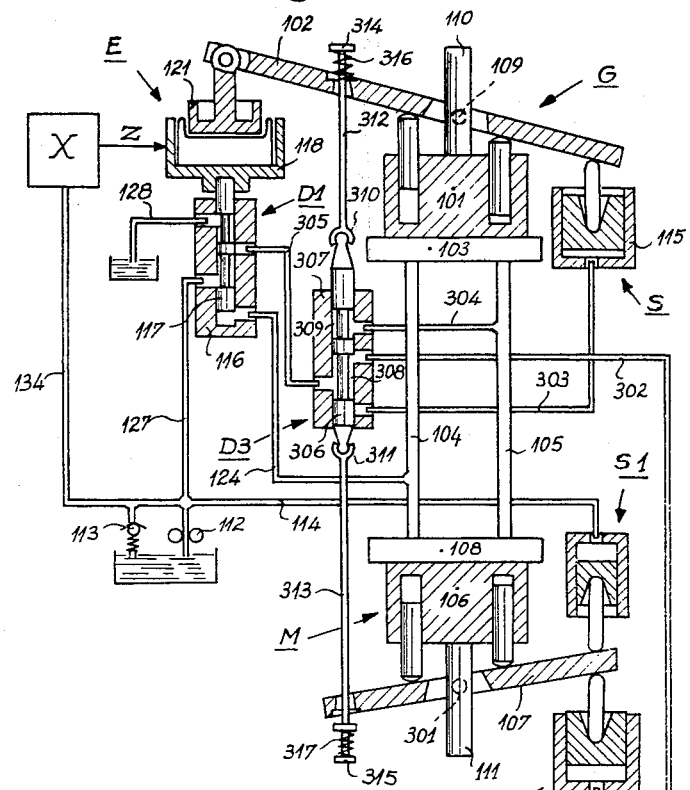

FIGURE 7 corresponds to the second functional mode of the system, with the generator cubic capacity set at maximum value and the motor cubic capacity remaining variable.

Considering now the configuration of FIGURE 7, an examination of the ports communicating with chambers 308 and 309 of the D3 slide 306 shows that the cylinder capacity of actuator S has been isolated, thereby restraining plate 102 of G at maximum inclination irrespective of the thrust $ax$ in chamber E, and that the cylinder of actuator S2 is being continuously supplied with the regulated low pressure delivered by distributor-regulator D1.

This being so, it will be assumed (as in the example of FIGURE 1) that the transmission has achieved a steady state, wherein slide 117 of D1 is in equilibrium under the opposing thrusts $ax$ and $bP$ exerted respectively by the gas in chamber E and the high pressure P of the transmission liquid.

Should the opposing torque, given by $$C2 = \frac{PV2}{2}$$

drop, the first effect of this, for the specific setting given to impulsor plate 107 of M, will be to decrease the pressure P.

As a result, the pressing force $ax$ will overcome the opposing force $bP$ and slide 117 of D1 will move downwardly, thus causing actuator S2 to discharge and immediately reducing the cubic capacity V2 of motor M. Assuming the opposing torque to be maintained at its new value during this adjustment, the constancy of the product PV2 shows that the increase in V2 is offset by a reduction in P, which reduction continues until the opposing force bP becomes equal once more to the opposing thrust ax of the gas, thus returning slide 117 into equilibrium.

If, on the contrary, the opposing torque had increased, it will readily be appreciated that the pressure P would first have increased, thrusting slide 117 of D1 upwardly, feeding actuator S2 with the pump low pressure and therefore increasing the cubic capacity V2 of motor M. Again assuming constancy of the new opposing torque, it will be obvious that the increase in V2 would cause P to drop, thereby again returning slide 117 into its equilibrium position.

It should be noted, however, that this position of equilibrium of slide 117 is now constantly achieved for a constant volume $v$ and hence for a constant pressure $x$ of the reference gas, so that the relation of equilibrium $$P = \frac{a}{b}x$$

shows that the high pressure P of the transmission liquid is also constant.

This automatic maintenance of the balance of slide 117, accomplished as hereinbefore indicated in response to the actuator S2 controlled by distributor-regulator D1 by reference to the constant pressure $x$ of the mass of gas, thus ensures the constancy of the liquid pressure P at the same time.

Now, as was stated in the preamble to the present description, this constancy of P is precisely the prime requirement for operation of the transmission system with constant input torque and variable opposing torque, with the demultiplication ratio accordingly corrected by varying the cubic capacity of the motor while that of the generator remains constant.

It is thus possible, by taking as reference the pressure of the mass of gas utilized under the conditions set forth precedingly, to regulate the transmission with sensitivity and reliability in both functional modes contemplated hereinabove.

These two modes can be used consecutively whereby to provide joint coverage of the two halves of the total range of variation of the transmission drive ratio.

The transition from one to the other of these functional modes is effected by way of an intermediate phase characterized by the position of distributor D3 shown in FIGURE 6, which intermediate phase is in no case a neutral point for the regulation control system but constitutes, on the contrary, a two-way state of transition of the system toward either of its functional modes.

I claim:

1. A method of regulating the input torque of a revolvingg-barrel-and-plungers type hydraulic transmismission, more particularly for motor vehicles, wherein the constancy of said input torque for a given power is obtained by varying the cubic capacity of either generator unit or motor unit of said transmission, these two parameters being susceptible of being used exclusively or consecutively, characterized in that mode of regulation is based on continuously maintaining the balance, by means of a distributor-regulator, between two forces which are respectively proportional to high pressure of a transmission liquid and to reference pressure of a mass of gas of substantially constant temperature enclosed at least partly in a deformable chamber and whose volume, which is adjustable as a function of the power required, is made proportional to the cubic capacity of said generator, corrections to transmission ratio being effected by operating on an associated impulsor plate of either said generator or said motor through hydraulic means controlled by said distributor-regulator.

2. Apparatus for performing the hydraulic transmission regulating method of claim 1, comprising a two-part deformable chamber of which one part is a cylindrical reservoir fluid-tightly closed by a flexible diaphragm containing at least part of said reference gas and of which the other is a piston slidable with side clearance in said reservoir by thrusting back said diaphragm, a distributor-regulator whose slide has one of its extremities associated with said generator impulsor plate through a mechanical linkage that includes said deformable chamber whereby the elastic expansion force in the latter tends both to increase the degree of inclination of said impulsor plate and to thrust said slide inwardly into a casting of said distributor-regulator against the countering force exerted on its other extremity by the high pressure of the transmission system, said slide having two waisted sections respectively communicating with a low pressure delivered by a supply pump and with a discharge tank and an intermediate section whose axial length is equal to the breadth of one of the terminal openings of a conduit through which said distributor-regulator delivers liquid under reduced pressure from said low-pressure delivery, hydraulic control means of the inclination of at least one of said impulsor plates comprising at least one actuator operated by the reduced pressure from said distributor-regulator, and a mechanism for modifying the volume occupied by said reference gas as a function of the power required.

3. Apparatus as claimed in claim 2, wherein the hydraulic means for correcting the transmission ratio are restricted to a single actuator fed by said distributor-regulator and acting upon said generator impulsor plate in the sense of reducing the cubic capacity of said generator against the countering thrust of said deformable chamber, the motor impulsor plate being permanently set at maximum inclination.

4. Apparatus as claimed in claim 2, wherein the hydraulic means for correcting the transmission ratio comprise three actuators of which the first tends to reduce the generator cubic capacity and the second and third to respectively reduce and increase the motor cubic capacity, said second actuator being weaker than the third and being continuously supplied with the supply pump low pressure, and a distributor connected to said first and third actuators, to said distributor-regulator and to said pump low pressure, the slide of said distributor being so associated to the motion of said impulsor plates as to be capable of assuming two limit positions in one of which said third actuator is directly connected to said supply pump low pressure whereby to restrain said motor impulsor plate in its position corresponding to maximum cubic capacity while said first actuator is connected to said distributor-regulator whereby the transmission ratio is corrected by varying the inclination of the generator impulsor plate and in the other of which said first actuator has its supply restrained at minimum capacity whereby said generator plate is restrained in its position corresponding to maximum generator cubic capacity while said third actuator is in turn supplied by said distributor-regulator, in consequence whereof said motor impulsor plate fulfills the function of transmission ratio corrector.

5. Apparatus as claimed in claim 4, wherein the slide of said distributor has each of its extremities pivotally connected to a rod bearing a terminal abutment and adapted to slide in an opening embodied in the corresponding impulsor plate with spring means fitted over said rod intermediate the corresponding plate and abutment, said rods being of lengths such that they are set under elastic tension when one of said impulsor plates places itself in the position of maximum cubic capacity when the other plate is already in that position, said slide being invariably prevented from dwelling in this intermediate position by a specific porting arrangement in said distributor.

6. Apparatus as claimed in claim 2, wherein the mechanism for adjusting the volume occupied by said reference gas as a function of the power required comprises an auxiliary distributor servo-controlled by a centrifugal governor and feeding an actuator adapted to move a cam-bearing lever against a countering return spring, which cam coacts with cam follower means whereby to displace the same and thereby effect the desired change of volume.

7. Apparatus as claimed in claim 6, wherein said distributor-regulator slide is additionally directly integral with one of said two parts of said deformable chamber, the other part of which is directly pivotally connected to said generator impulsor plate.

8. Apparatus as claimed in claim 7, wherein the main casting of said distributor-regulator is stationary and wherein said cam follower means is a piston of a volume variator of known type whose cylinder communicates with said deformable chamber.

9. Apparatus as claimed in claim 7, wherein said distributor-regulator casting is movable and acts as said cam follower means.

10. Apparatus as claimed in claim 6, wherein said distributor-regulator casting is stationary and wherein said distributor-regulator slide is pivotally connected to one end of a lever which is fulcrumed about a shaft rigid with said generator impulsor plate and the other end of which is pivotally connected to one of said two deformable chamber parts, the other part of which constitutes said cam follower means.

No references cited.

SAMUEL LEVINE, *Primary Examiner.*

EDGAR W. GEOGHEGAN, *Examiner.*